United States Patent
Harbarth et al.

(10) Patent No.: US 8,583,623 B2
(45) Date of Patent: Nov. 12, 2013

(54) METHOD AND DATABASE SYSTEM FOR PRE-PROCESSING AN XQUERY

(75) Inventors: Juliane Harbarth, Griesheim (DE); Thorsten Fiebig, Mannheim (DE); Kay Hans-Peter Winkler, Darmstadt (DE)

(73) Assignee: Software AG, Darmstadt (DE)

( * ) Notice: Subject to any disclaimer, the term of this patent is extended or adjusted under 35 U.S.C. 154(b) by 903 days.

(21) Appl. No.: 11/851,545

(22) Filed: Sep. 7, 2007

(65) Prior Publication Data

US 2009/0063401 A1    Mar. 5, 2009

(30) Foreign Application Priority Data

Sep. 3, 2007 (EP) ..................... 07017213

(51) Int. Cl.
*G06F 17/30* (2006.01)

(52) U.S. Cl.
USPC .......................... 707/713; 707/758

(58) Field of Classification Search
USPC ......................... 707/759, 713–721
See application file for complete search history.

(56) References Cited

U.S. PATENT DOCUMENTS

| | | | |
|---|---|---|---|
| 5,694,591 A | 12/1997 | Du et al. | |
| 5,848,404 A | 12/1998 | Hafner et al. | |
| 5,875,445 A | 2/1999 | Antonshenkov | |
| 6,253,195 B1 | 6/2001 | Hudis et al. | |
| 7,051,034 B1 | 5/2006 | Ghosh et al. | |
| 7,054,854 B1 | 5/2006 | Hattori | |
| 7,181,464 B2 | 2/2007 | Madan et al. | |
| 2003/0212662 A1 | 11/2003 | Shin et al. | |
| 2005/0097084 A1* | 5/2005 | Balmin et al. | 707/3 |
| 2007/0022105 A1 | 1/2007 | Roux | |
| 2007/0233645 A1* | 10/2007 | Peterson et al. | 707/3 |
| 2007/0250471 A1 | 10/2007 | Fontoura et al. | |
| 2007/0250527 A1 | 10/2007 | Murthy | |
| 2008/0010256 A1* | 1/2008 | Lindblad et al. | 707/3 |
| 2008/0082526 A1* | 4/2008 | Kanawa | 707/5 |
| 2008/0120321 A1* | 5/2008 | Liu et al. | 707/102 |
| 2008/0235252 A1* | 9/2008 | Sakai et al. | 707/100 |
| 2010/0250519 A1* | 9/2010 | Fiebig et al. | 707/718 |

OTHER PUBLICATIONS

Fernandez et al, Optimizing Regular Path Expressions Usign Graph Schemas, Feb. 1998, Data Engineering, 1998. Proceedings., 14th International Conference; pp. 1-10; http://ieeexplore.ieee.org/xpls/abs_all.jsp?arnumber=655753&tag=1.*

(Continued)

*Primary Examiner* — Jacob F Bétit
*Assistant Examiner* — Amanda Willis
(74) *Attorney, Agent, or Firm* — Meyertons Hood Kivlin Kowert & Goetzel, P.C.; Jeffrey C. Hood; Joel L. Stevens (57) ABSTRACT

A method of pre-processing an XQuery on a XML data base and may comprise parsing the XQuery to obtain an abstract syntax tree and typing the abstract syntax tree to provide at least one pointer into a schema for XML documents of the XML data base. The typing step may involve the use of schema and accumulated instance data of the XML data base. Use of the accumulated instance data in addition to schema data allows for reduction of the set of pointers to a smaller set, which in turn reduces the number of documents to be examined when the query is executed.

16 Claims, 4 Drawing Sheets (56) References Cited

OTHER PUBLICATIONS

Guo et al, "Index Selection for Efficient XML Path Expression Processing", Conceptual Modeling for Novel Application Domains, ER 2003 Workshops ECOMO, IWCMQ, AOIS, and XSDM, Springer-Verlag, Berlin, Germany, 2003, pp. 261-272.

Meng et al, "OrientX: An Integrated Schema-Based Native XML Database System", Wuhan University Journal of Natural Sciences Editorial Department, China, vol. 11, No. 5, Sep. 2006, pp. 1192-1196.

European search report for application No. EP 07 01 7213, search completed Nov. 26, 2007.

Fernandez, M. and Suciu, D. "Optimizing Regular Path Expressions Using Graph Schemas," 14th IEEE International Conference on Data Engineering, Feb. 23-27, 1998; 10 pages; AT & T Labs., Florham Park, NJ.

* cited by examiner

```
<?xml version="1.0" encoding="UTF-8" ?>
<xs:schema
    xmlns:xs="http://www.w3.org/2001/XMLSchema">

<xs:element name="bib">
 <xs:complexType>
   <xs:sequence>
     <xs:element ref="book" />
   </xs:sequence>
  </xs:complexType>
 </xs:element>

<xs:element name="book">
 <xs:complexType>
   <xs:sequence>
     <xs:element ref="title" />
     <xs:choice>
       <xs:element ref="author" maxOccurs="unbounded" />
       <xs:element ref="editor" maxOccurs="unbounded" />
     </xs:choice>
     <xs:element ref="publisher" />
     <xs:element ref="price" />
   </xs:sequence>
  </xs:complexType>
 </xs:element>

<xs:element name="author">
 <xs:complexType>
   <xs:sequence>
     <xs:element ref="last" />
     <xs:element ref="first" minOccurs="0" />
   </xs:sequence>
  </xs:complexType>
 </xs:element>

<xs:element name="editor">
 <xs:complexType>
   <xs:sequence>
     <xs:element ref="last" />
     <xs:element ref="first" minOccurs="0" /> />
     <xs:element ref="affiliation" />
   </xs:sequence>
  </xs:complexType>
 </xs:element>

<xs:element name="title" type="xs:string"/>
  <xs:element name="last" type="xs:string"/>
<xs:element name="first" type="xs:string"/>
<xs:element name="affiliation" type="xs:string"/>
<xs:element name="publisher" type="xs:string"/>
<xs:element name="price" type="xs:string"/>

</xs:schema>
```

METHOD AND DATABASE SYSTEM FOR PRE-PROCESSING AN XQUERY

PRIORITY CLAIM

This application claims benefit of priority of European application no. 07 017 213.5 titled "Method and Database System for Pre-Processing an XQuery", filed Sep. 3, 2007, and whose inventors are Juliane Harbarth, Thorsten Fiebig and Kay Hans-Peter Winkler.

INCORPORATED BY REFERENCE

European application no. 07 017 213.5 titled "Method and Database System for Pre-Processing an XQuery", filed Sep. 3, 2007, and whose inventors are Juliane Harbarth, Thorsten Fiebig and Kay Hans-Peter Winkler, is hereby incorporated by reference in its entirety as though fully and completely set forth herein.

TECHNICAL FIELD

The present invention relates to a method and a database system for pre-processing an XQuery.

THE PRIOR ART

Due to their flexibility, XML databases are used more and more as important technical tools of a modern information society. The efficient retrieval of XML data in response to a query is the primary purpose of almost any database system using an XML database.

Figure 1:
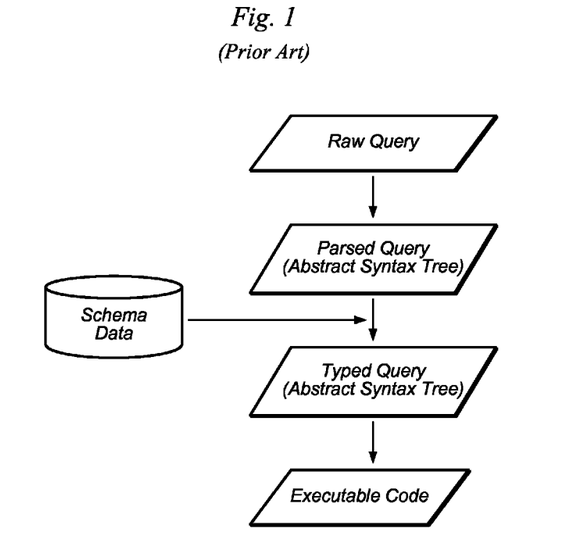
FIG. 1: A schematic flow chart of query processing in accordance with the prior art.

Executing a query upon an XML database is performed in multiple steps which are schematically shown in FIG. 1. At first, the raw query, which is typically defined in the XML Query Language (XQuery), is parsed, i.e. the different tokens of the query are recognized and the query is subsequently represented as a structured object, which is often referred to as Abstract Syntax Tree (AST).

In a next step the query is further processed, i.e. the AST undergoes certain changes or adornments that provide hints of how to create the query execution plan. The execution plan is a sequence of steps to be performed to obtain the query result. In this context, it is important to distinguish between compile-time and run-time steps. Only the query execution occurs at run-time, i.e. actually accesses the real data. Every other step happens at compile-time and can be considered to represent pre-processing steps. The overall purpose of any compile-time query action is to keep the actual run-time access short.

In the prior art as shown in FIG. 1, it is known to use schema data for the typing of the query, which is part of the query pre-processing (cf. the document "XQuery 1.0 and XPath 2.0 Formal Semantics", available online). Typing tries to attach a type to every expression of the query. This requires an underlying type system which defines existing types. In case of queries upon an XML data base, a possible type system is provided by the W3C XML Schema. Typing a query has two main purposes. First, some type errors can be detected (and better pointed at) already at compile time. The second and more important advantage is that type information provides hints for query optimization and/or execution, especially with respect to index usage. This is illustrated based on the following exemplary query:

```
for $book in input( )//book
where $book/author/last ="Suciu"
return $book/title
```

This query returns all titles of books in the current collection that have an author with last name 'Suciu'. Using an index upon "author/last" the execution of the above query uses less processing time and efforts, because the index lists all documents that actually contain "Suciu" as a book's author. Looking at every document individually is therefore not needed. Only title elements of these books have to be extracted.

The query pre-processing shown in FIG. 1 determines that an index is applicable by evaluating the schema data to make sure that the path expression, that denotes the value for which the indicated condition holds, only points to a certain field. Further, the XML database must have an index defined upon that field.

However, in some situations, the use of the schema data alone for successfully pre-processing an XQuery is not sufficient, in particular if the search condition is not as simple as in the above example. As a result, in spite of the typing step in FIG. 1, substantial time and processing power will still be needed for the major parts of queries that are executed on the XML database. Correspondingly, improvements in XML database querying are desired.

SUMMARY OF THE INVENTION

Various embodiments are described of a method of pre-processing an XQuery on a XML database. The method may include the steps of parsing the XQuery to obtain an abstract syntax tree and typing the abstract syntax tree (AST) to provide at least one pointer into a schema for XML documents of the XML data base, wherein the typing step involves the use of schema and accumulated instance data of the XML data base.

Typing information may be added during XQuery pre-processing to at least some of the expressions in the XQuery AST. The typing information may be a set of pointers into element or attribute descriptions in the schema underlying the XML documents of the XML data base. Using accumulated instance data in addition to schema data allows for reduction of the set of pointers to a smaller set, which in turn will reduce the number of documents to be examined when the query is finally executed.

In one embodiment, the accumulated instance data may include a list of paths representing elements and/or attributes occurring in XML documents of the XML database. Such a list may facilitate the optimal use of one or more indexes on the XML documents of the XML database.

More generally speaking, the XQuery may include an XPath expression and the method may include (e.g., as a last step) identifying a set of pointers onto the schema in accordance with the XPath expression and a step of excluding pointers, which according to the accumulated instance data do not occur in the XML database. The XPath expression may be examined from the left to the right and may include a location step along a child or attribute axis. If so, the corresponding step of identifying a set of pointers onto the schema may be performed before the step of excluding pointers, which according to the accumulated instance data do not occur in the XML database.

When the XPath expression is examined from the left to the right and includes a location step along a descendant or descendant-or-self axis, the corresponding step of identifying a set of pointers onto the schema may be performed after the step of excluding pointers, which according to the accumulated instance data do not occur in the XML database.

Combining the two sources of information, namely the schema data and the instance data, in a manner, which depends on the specific location step of the XPath expression of the query, may facilitate the later optimization of the query. After pre-processing and optimization, the query can be executed and the results thereof displayed to a user or stored on a storage medium.

In one embodiment, the method may further include the calculation of the expected numbers of documents of the XML database, which must be searched for executing the pre-processed XQuery during runtime. The expected number may be indicated as an interval between a minimum and a maximum number. Providing such a number can be valuable, since it allows for estimation of the amount of time, which is needed to actually execute the query, e.g., for a given hardware and software combination of a database system.

Additional modifications or amendments of the described method are envisioned and may be defined in further dependent claims.

Further, the methods described above may be implemented using various computer systems, computer programs which may be stored on a memory medium and executed by a processor. Such software may be installed on any kind of hardware involved with the processing of database queries such as a mainframe, a server or client of a client-server architecture or any other kind of processing system.

Finally, the methods described above may be implemented using a database system for an XML data base comprising a search engine for XQueries.

SHORT DESCRIPTION OF THE DRAWINGS

In the following detailed description, presently preferred embodiments of the invention are further described with reference to the following figures.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

In the following, preferred embodiments of the invention are described. At first, a substantially simplified example for the combination of schema based information with information based on accumulated user data is presented. In a second part, the general concept and its various alternatives are generally discussed.

Figure 2:
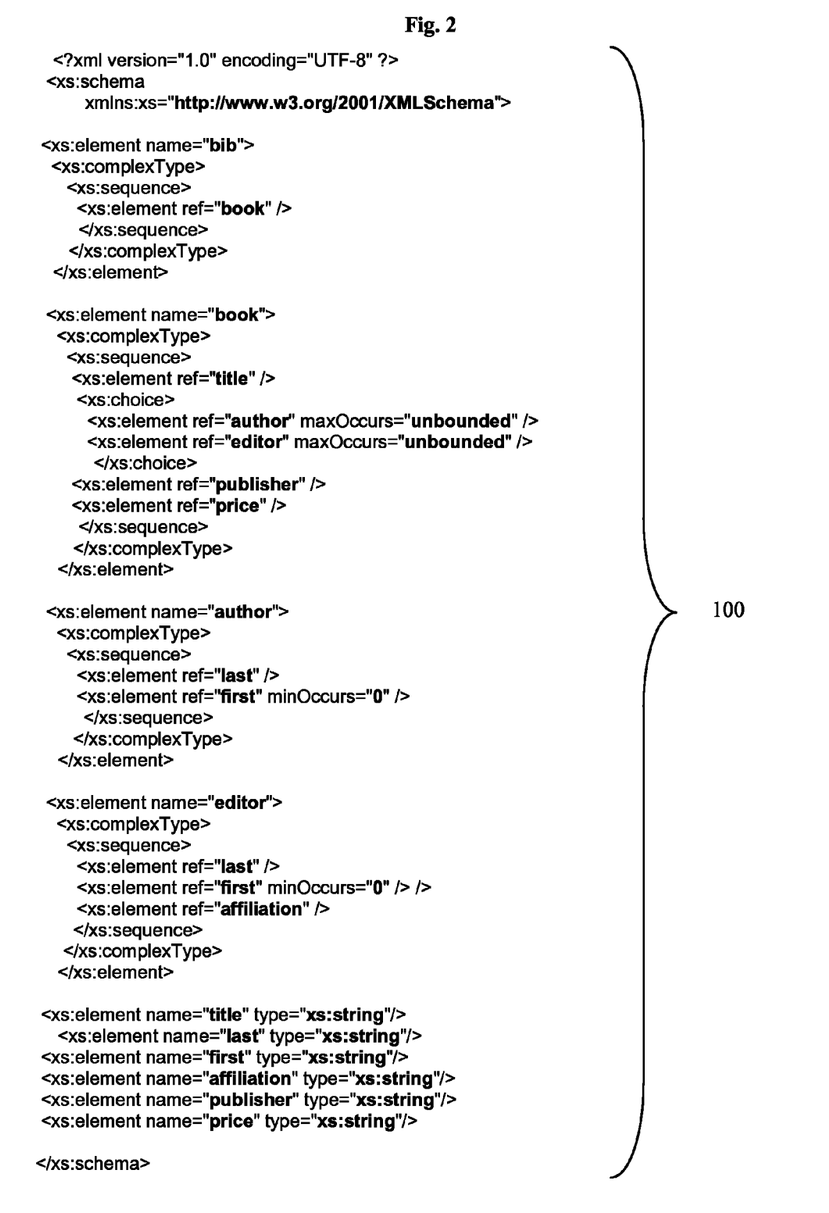
FIG. 2: An exemplary schema for the XML documents of an exemplary XML data base, according to one embodiment.

FIG. 2 presents an example of a XML schema 100, which defines the structure of XML documents of a XML data base. The XML schema of FIG. 2 adheres to the respective W3C recommendation, which can for example be found online. As an amendment to the schema of FIG. 2, there may be a proprietary notation to state that a certain field described in the XML schema is defined as an index. This amendment might look as shown under the reference numeral 200 in FIG. 3.

Figure 3:
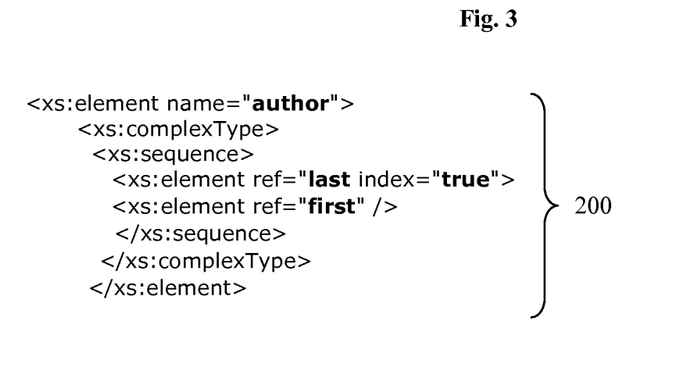
FIG. 3: An additional definition for the schema of FIG. 2, according to one embodiment.

In case of a simple query, such as the one described in the Introduction above, the XML schema 100 of FIG. 2 and, more specifically, the amendment 200 of FIG. 3 may allow for detection during query pre-processing, e.g., so that the index defined in the amendment 200 can be used for efficiently executing such a query. In this case, the information provided with the path in the query may be fully sufficient to point to the corresponding entry in the schema and to thereby successfully pre-process the whole query without the use of any instance data.

There are however situations where looking at the path information provided with the query and the schema does not suffice, as in the following exemplary query:

```
for $book in input( )//book
where $book//last ="Suciu"
return $book/title
```

Here, the index defined in the amendment 200 upon "author/last" can not be used, since the path statement "$book//last" also points to the element "editor/last" of the XML schema.

In such a situation accumulated instance information can additionally be used for query pre-processing. For example, the information that no editor's last name is provided throughout all of the XML documents of the database would re-allow use of the index defined upon "author/last".

Generally, the term "accumulated instance information" can refer to any kind of information which elements or attributes that are described in the XML schema of the XML data base actually occur in instances, or how often they occur, or even which values are realized. In the simplified example of FIG. 4, it is assumed that the accumulated instance information is a list or table 300 of paths representing all elements, which are possible in XML documents according to the schema of FIG. 2 (except for the document element that necessarily occurs in every document). Each such path gets paired with a list of document ids pointing to those documents in which that element occurs.

Figure 4:
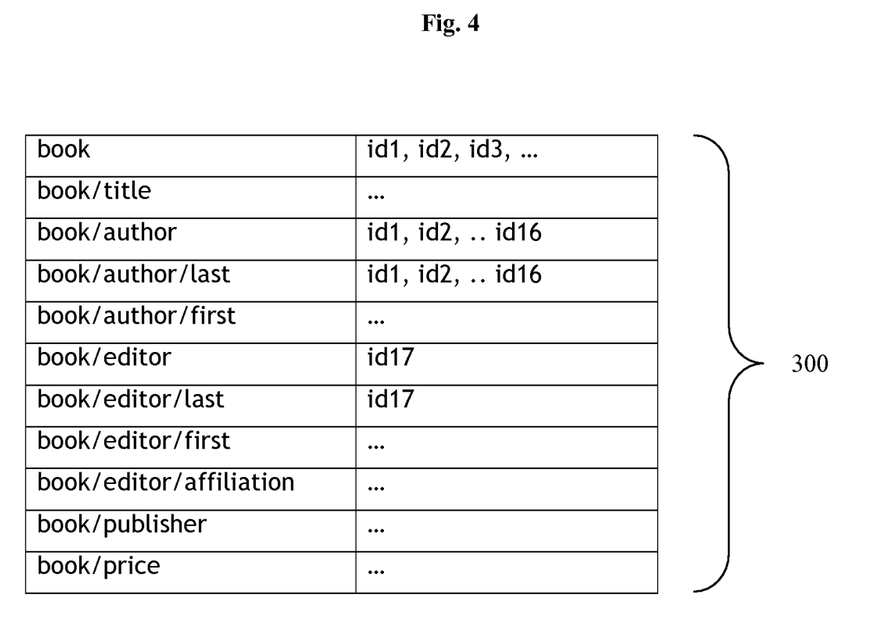
FIG. 4: An example of accumulated instance information, according to one embodiment.

Returning to the above exemplary query based on a path "book//last", it might be best to design the query execution in two phases. The one document containing an editor/last element can be dealt with individually and for the rest of the data, using the index defined upon author/last is still appropriate.

The efficiency gain obtained by applying the present invention is substantial: Rather than disregarding the index defined upon "author/last" and searching through all of the XML documents in the database, the accumulated instance data allow to retain the use of the index and to directly investigate only a single additional document of the XML data base.

Figure 5:
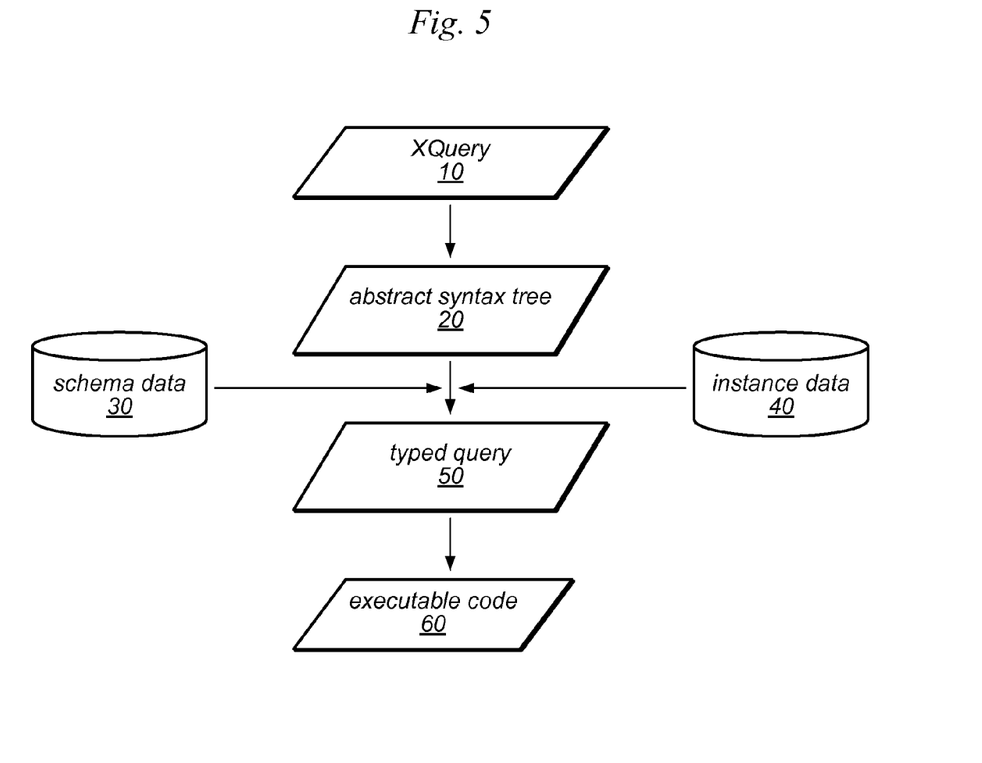
FIG. 5: A schematic flow chart illustrating query processing in accordance with an embodiment of the present invention.

Explaining embodiments of the invention now in more general terms, typing during XQuery pre-processing comprises the addition of type information preferably to each expression in the XQuery AST. The type information that may be added to an expression denoting a sequence of nodes from the XML data base may include the following items (among others):

A set of pointers into the schema;

For each set schema pointers, a set of documents, in which the current nodes adhering to this schema pointer are to be found;

The resulting type information may be obtained by following both sources of typing information and by combining the retrieved information. Examining expressions thus leads to a navigation through both information sources. This is schematically shown in F*ig.* 5. Similar to FIG. 1, there is at first a parsing step for the XQuery 10 leading to the AST 20. However, in contrast to the flow chart of FIG. 1, the AST 20 is further pre-processed based on both, schema data 30 and instance data 40, which together lead to the typed query 50. Further optional optimization steps eventually provide the executable code 60 for the XQuery.

In the following, an overview is provided of possible expressions in an XQuery, and how to pre-process them based on a combination of schema and accumulated instance information. The expressions comprise, among others, one or more of the following groups:

XPath Expressions

XPath Expressions with filter conditions

Joins

Sequence Operations

With respect to XPath expressions, it may be assumed that every XPath expression starts with an expression collecting documents and continues with traversing along the following axes:

attribute
child
descendant
descendant-or-self
parent

A location step following an axis of the XPath expression might not provide an exact name to be retrieved but may use one or more of the following three wildcard options:

*:name
name:*
*

Location steps, axes and wildcards of XPath expressions are described in more detail in the W3C's XPath 1.0 Recommendation (cf. for example http://www.w3.org/TR/xpath).

Inspecting path expressions for typing purposes may include examining the expression stepwise from left to right and for each location step considering what was obtained by the previous location step and which axis is used in the current location step.

With respect to an attribute or child axis, the schema may be at first consulted for the next location step. Assuming the path expression up to that step could be represented by a set of schema pointers, this should hold for the expression including the current step. The set can become bigger when wildcards are used in the next step, since one schema element pointer can lead to multiple sub-element pointers, if the pattern happens to cover more than one of the element's sub-elements. The set can become smaller, if a name (or pattern) does not fit any of the element's sub-elements. After having computed the result by looking at the schema, the instance information may be used to get rid of those result elements that do not occur.

When following the descendant (or descendant-or-self) axis, it is recommended to refer to the instance information first, since asking the schema to provide all possible descendants often results in very big element sets. The result must be computed back to pointers into the schema.

Following the parent axis may be performed as follows: In the schema, the respective parent elements from the set of current pointers is retrieved. The set of schema pointers becomes smaller, if the previous set contained pointers to elements having the same parent.

In the instance information, each schema pointer may be assigned the union of the document pointers that belonged to one of the schema pointers that was the predecessor to this schema pointer. That means that the total set of document pointers remains unchanged. For example in case of the following expression:

Input( )//book/author[last="Suciu"]/ . . .

Typing the part preceding the parent step may yield a schema pointer to "book/author" and a set of documents that contain the path "book/author/last". Now following the parent axis, the schema pointer may be switched to the book element, but the documents that need to be scanned are still those containing book/author/last since only those documents could be found following the complete path.

Filters and where expressions are the same thing spelled differently. A filter condition can be formulated as a where clause by representing the current node by a variable: node [value='const' ]<–> where $a/value='const'.

When filters are included in path expressions, they may be used to diminish the set of schema pointers and/or to be more restrictive with respect to the number of results to be expected. If filters contain path expressions, these may be evaluated. If the filter expression can be proven to be always false due to paths leading to empty results, the whole path's type may be empty and typing can be dropped.

Filters can be logical expressions. If a part of an or-expression pertains to an empty typed expression, this part can be dropped. If a part of an and-expression is typed empty, the whole expression may be dropped.

Document pointers can be used as follows: If a sub-expression in a filter yields some results (i.e. document pointers), but those pointers do not intersect with the document pointers obtained with the filtered result, the whole expression may be typed empty. This is illustrated by the following example: collection("bookshop")/bib/book[tf:containsText(title, "Web")and author]

Typing this expression with respect to schema pointers yields all results that pertain to the schema entry 'book'. Having calculated the set of all documents containing books in the previous step, the filter allows to excluding those documents which do not contain both a "book/title" path and a "book/author" path.

Typing a join means typing the return clause. As most join return clauses are generated elements which contain path expressions, typing the join means typing these path expressions. They are typed considering the additional filter criterion specified by the join criterion. This means that only those documents are retained which have an entry defined for the fields occurring in a join criterion.

```
for $b in collection("bib")/bib/book
for $p in collection("bookshop")/price
where $b/@isbn = $p/@isbn
return <book>{$b/title}{$p}</book>
```

Both the first and the second 'for' expressions are typed with respect to the schema pointers and the documents to be scanned. The expressions to be typed now are $b/title and $p.

The document set may be the set of book occurrences that also contain an isbn attribute, since instances of book without an isbn attribute are not taking part in the join. The $p schema pointers may be the same as those for collection("bookshop")/price. The document set may be the set of collection ("bookshop")/price minus those documents that do not contain an isbn attribute.

Sequence operations on typed path expressions can be unions, intersections, and differences. Typing a union of two typed expressions means that the pointers into the schema are a union of the separate schema pointer sets. For each schema pointer, the set of the document pointers may be the union of the document pointers that belong to this schema pointer in one or both of the subsets.

For typing an intersection, the pointers into the schema as well as the document sets are intersected. Typing a difference, finally, retains the type of the first expression.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method of pre-processing an XQuery on an XML data base, the method comprising:
   using a computer to perform:
      receiving the XQuery;
      parsing the XQuery to obtain an abstract syntax tree;
      typing the abstract syntax tree to provide at least one pointer into a schema for XML documents of the XML data base, wherein said typing involves the use of schema data and a list of paths defining structural information of locations of elements or attributes occurring in XML documents of the XML data base, and wherein said typing comprises:
         inspecting an XPath expression of the XQuery in a stepwise manner, and for each location step along an axis in the path expression corresponding to a node in the abstract syntax tree:
            determining type information for the node from the schema data or the list of paths based on the axis of the location step or information regarding a previous location step;
         identifying a set of pointers onto the schema in accordance with the XPath expression of the XQuery based on the type information; and
         excluding pointers, which, according to the list of paths, do not occur in the XML data base;
      wherein after said parsing and said typing the XQuery is executable to be performed on the XML database.

2. The method of claim 1, wherein said typing further comprises:
   providing, for the at least one pointer, a set of XML documents of the XML data base having at least one node adhering to the at least one pointer.

3. The method of claim 1, further comprising:
   examining the XPath expression from the left to the right, and wherein the XPath expression includes a location step along a child or attribute axis;
   wherein said identifying a set of pointers onto the schema is performed before said excluding pointers, which, according to the list of paths, do not occur in the XML data base.

4. The method of claim 1, wherein the XPath expression comprises a filter expression.

5. The method of claim 1, wherein said typing further comprises:
   calculating expected numbers of documents of the XML data base, which must be searched for executing the XQuery during runtime.

6. The method of claim 5, wherein the expected number is indicated as an interval between a minimum and a maximum number.

7. The method of claim 1, further comprising:
   executing the XQuery on the XML database;
   wherein said steps of parsing and typing reduces a number of documents to be examined when the XQuery is executed.

8. The method of claim 1, further comprising:
   examining the XPath expression from the left to the right, wherein the XPath expression includes a location step along a descendant or descendant-or-self axis;
   wherein said identifying the set of pointers onto the schema is performed after said excluding pointers, which, according to the list of paths, do not occur in the XML data base.

9. A non-transitory computer-accessible memory medium comprising program instructions for pre-processing an XQuery on a XML data base, wherein the program instructions are executable by a processor to:
   parse the XQuery to obtain an abstract syntax tree;
   type the abstract syntax tree to provide at least one pointer into a schema for XML documents of the XML data base, wherein said typing involves the use of schema data and a list of paths representing defining structural information of locations of elements or attributes occurring in XML documents of the XML data base, and wherein said typing comprises:
      inspecting an XPath expression of the XQuery in a stepwise manner, and for each location step along an axis in the path expression corresponding to a node in the abstract syntax tree:
         determining type information for the node from the schema data or the list of paths based on the axis of the location step or information regarding a previous location step;
      identifying a set of pointers onto the schema in accordance with the XPath expression of the XQuery based on the type information; and
      excluding pointers, which, according to the the list of paths, do not occur in the XML data base;
   execute the XQuery on the XML database after said parsing and said typing.

10. The non-transitory computer-accessible memory medium of claim 9, wherein said typing further comprises:
    providing, for the at least one pointer, a set of XML documents of the XML data base having at least one node adhering to the at least one pointer.

11. The non-transitory computer-accessible memory medium of claim 9, wherein the program instructions are further executable to:
    examine the XPath expression from the left to the right, and wherein the XPath expression includes a location step along a child or attribute axis;
    wherein said identifying a set of pointers onto the schema is performed before said excluding pointers, which, according to the list of paths, do not occur in the XML data base.

12. The non-transitory computer-accessible memory medium of claim 9, wherein the XPath expression comprises a filter expression.

13. The non-transitory computer-accessible memory medium of claim 9, wherein said typing further comprises:
   calculating expected numbers of documents of the XML data base, which must be searched for executing the pre-processed XQuery during runtime.

14. The non-transitory computer-accessible memory medium of claim 13, wherein the expected number is indicated as an interval between a minimum and a maximum number.

15. The non-transitory computer-accessible memory medium of claim 9, wherein the program instructions are further executable to:
   examine the XPath expression from the left to the right, wherein the XPath expression includes a location step along a descendant or descendant-or-self axis;
   wherein said identifying the set of pointers onto the schema is performed after said excluding pointers, which, according to the list of paths, do not occur in the XML data base.

16. A system, comprising:
   a computer system storing an XML database;
   a memory medium coupled to or comprised in the computer system, wherein the memory medium stores program instructions that are executable to:
   receive the XQuery;
   parse the XQuery to obtain an abstract syntax tree;
   type the abstract syntax tree to provide at least one pointer into a schema for XML documents of the XML data base, wherein said typing involves the use of schema data and a list of paths defining structural information of locations of elements or attributes occurring in XML documents of the XML data base, and wherein said typing comprises:
      inspecting an XPath expression of the XQuery in a stepwise manner, and for each location step along an axis in the path expression corresponding to a node in the abstract syntax tree:
         determining type information for the node from the schema data or the list of paths based on the axis of the location step or information regarding a previous location step;
      identifying a set of pointers onto the schema in accordance with the XPath expression of the XQuery based on the type information; and
      excluding pointers, which, according to the the list of paths, do not occur in the XML data base;
   wherein after said parsing and said typing the XQuery is executable to be performed on the XML database.

* * * * *

UNITED STATES PATENT AND TRADEMARK OFFICE
CERTIFICATE OF CORRECTION

PATENT NO.         : 8,583,623 B2                                        Page 1 of 1
APPLICATION NO.    : 11/851545
DATED              : November 12, 2013
INVENTOR(S)        : Harbarth et al.

It is certified that error appears in the above-identified patent and that said Letters Patent is hereby corrected as shown below:

In the Claim

Claim 9, Column 8, Line 31, please delete "paths representing defining" and substitute -- paths defining --.

Signed and Sealed this
Seventh Day of January, 2014

Margaret A. Focarino
*Commissioner for Patents of the United States Patent and Trademark Office*